United States Patent
Watanabe et al.

(10) Patent No.: US 8,617,433 B2
(45) Date of Patent: *Dec. 31, 2013

(54) CONDUCTIVE SINTERED OXIDE, THERMISTOR ELEMENT INCLUDING THE SAME, AND TEMPERATURE SENSOR INCLUDING THE SAME

(75) Inventors: Hiroshi Watanabe, Kitanagoya (JP);
Yasayuki Okimura, Inuyama (JP);
Shinji Ban, Gifu (JP); Takeshi Mitsuoka, Konan (JP)

(73) Assignee: NGK Spark Plug Co., Ltd., Aichi (JP)

( * ) Notice: Subject to any disclaimer, the term of this patent is extended or adjusted under 35 U.S.C. 154(b) by 161 days.

This patent is subject to a terminal disclaimer.

(21) Appl. No.: 13/210,430

(22) Filed: Aug. 16, 2011

(65) Prior Publication Data

US 2012/0043513 A1    Feb. 23, 2012

(30) Foreign Application Priority Data

Aug. 17, 2010 (JP) .................. 2010-182636

(51) Int. Cl.
*H01B 1/02* (2006.01)

(52) U.S. Cl.
USPC ............ 252/521.1; 252/519.13; 252/520.21; 252/520.4; 252/520.5; 338/25; 428/72; 501/127; 501/152; 501/153

(58) Field of Classification Search
USPC ............... 252/519.15, 520.21, 520.4, 520.5, 252/521.1; 428/702; 501/127, 152, 153; 338/22, 25

See application file for complete search history.

(56) References Cited

U.S. PATENT DOCUMENTS

| | | | |
|---|---|---|---|
| 7,656,269 B2 | 2/2010 | Mizoguchi et al. | |
| 2003/0027707 A1* | 2/2003 | Yamamoto et al. | 501/127 |
| 2003/0049500 A1* | 3/2003 | Takai et al. | 428/702 |
| 2006/0186385 A1* | 8/2006 | Chosokabe et al. | 252/521.1 |
| 2009/0016409 A1 | 1/2009 | Mizoguchi et al. | |
| 2010/0134238 A1 | 6/2010 | Fujiwara et al. | |
| 2011/0220854 A1 | 9/2011 | Okimura et al. | |

FOREIGN PATENT DOCUMENTS

| | | | |
|---|---|---|---|
| EP | 1564197 A1 | 8/2005 | |
| EP | 1775274 A1 | 4/2007 | |
| EP | 2177491 A1 | 4/2010 | |
| EP | 2402297 A1 | 1/2012 | |
| JP | 2007-246381 | * 9/2007 | C04B 35/00 |
| JP | 2007-246381 A | 9/2007 | |

OTHER PUBLICATIONS

Extended European Search Report issued on Feb. 6, 2012 in the European Patent Application No. 11177816.

* cited by examiner

*Primary Examiner* — Khanh Tuan Nguyen
(74) *Attorney, Agent, or Firm* — Sughrue Mion, PLLC (57) ABSTRACT

A conductive sintered oxide including: a first crystal phase represented by $RE1_4Al_2O_9$ and a second crystal phase having a perovskite structure represented by $(RE2_{1-c}SL_c)(Al_xM1_y)O_3$. RE1 is a first element group consisting of Yb and/or Lu and at least one element selected from Group IIIA elements excluding Yb, Lu and La. RE2 is a second element group consisting of at least one element selected from Group IIIA elements excluding La and including at least one of the elements constituting the first element group RE1. SL is an element group consisting of at least one of Sr, Ca and Mg and which includes Sr as a main element, and M1 is an element group consisting of at least one element selected from Groups IVA, VA, VIA, VIIA and VIII excluding Cr. The coefficient c is in the range of $0.18 < c < 0.50$, and the coefficients x and y are in the range of $0.95 \leq x+y \leq 1.1$.

8 Claims, 4 Drawing Sheets

CONDUCTIVE SINTERED OXIDE, THERMISTOR ELEMENT INCLUDING THE SAME, AND TEMPERATURE SENSOR INCLUDING THE SAME

BACKGROUND OF THE INVENTION

1. Field of the Invention

The present invention relates to a conductive sintered oxide which has electrically conductive properties and which changes in resistance with a change in temperature. The invention further relates to a thermistor element including the sintered oxide, and to a temperature sensor including the thermistor element.

2. Description of the Related Art

Applications of thermistor elements and temperature sensors include measurement of exhaust gas temperature from internal-combustion engines such as automobile engines. For use in these applications, temperature sensors are desired not only for temperature measurements in high-temperature regions, but also for detecting low temperatures so that a failure (breakage of wire) of the temperature sensor can be detected with, for example, OBD systems (on-board diagnostic systems) or the like.

Patent document 1 discloses, as a technique for satisfying this need, a conductive sintered oxide which has a temperature gradient constant (constant B) of about 2,000-3,000K.
[Patent Document 1] JP-A-2007-246381

3. Problems to be Solved by the Invention

However, the temperature ranges to be measured by thermistor elements vary, and there is a need for a thermistor element which is applicable over a wider temperature range and has an even lower value of constant B.

Such a thermistor element is suitably used for temperature measurements in the temperature range of −40° C. to +600° C., for example, in exhaust gas temperature measurements such as the application described above. In addition, with respect to detection of a failure in a temperature sensor employing such a thermistor element, detection of wire breakage in a lower-temperature region and detection of short-circuiting in a higher-temperature region can be precisely made based on the output of the temperature sensor (thermistor element).

SUMMARY OF THE INVENTION

An object of the present invention, which has been achieved to meet the above needs, is to provide a conductive sintered oxide allowing for suitable temperature measurements over a wide temperature range. Another object of the invention is to provide a thermistor element including the conductive sintered oxide and a temperature sensor including the thermistor element.

The above objects of the invention have been achieved by providing a conductive sintered oxide which comprises a first crystal phase having a composition represented by $RE1_4Al_2O_9$ and a second crystal phase having a perovskite structure represented by $(RE2_{1-c}SL_c)(Al_xM1_y)O_3$, in which RE1 is a first element group consisting of Yb and/or Lu and at least one element selected from Group IIIA elements excluding Yb, Lu and La, RE2 is a second element group consisting of at least one element selected from Group IIIA elements excluding La and including at least one of the elements constituting the first element group RE1, SL is an element group consisting of at least one of Sr, Ca and Mg and which includes Sr as a main element in terms of molar proportion, and M1 is an element group consisting of at least one element selected from Groups IVA, VA, VIA, VIIA and VIII excluding Cr, the coefficient c of the second crystal phase is in the range of $0.18 < c < 0.50$, and the coefficients x and y of the second crystal phase is in the range of $0.95 \leq x+y \leq 1.1$.

The conductive sintered oxide includes the first crystal phase, which contains the first element group RE1 and aluminum. The sintered oxide further includes the second crystal phase, which has a perovskite structure in which the constant c, which defines the amounts of the second element group RE2 and the element group SL consisting of one or more Group IIA (Group 2 new IUPAC numbering) elements in A sites of the perovskite structure, is within the given range, and in which aluminum and the element group M1, e.g., Group IVA (Group 4 new IUPAC numbering) elements, are contained in B sites of the perovskite structure. In addition, Cr is not included in the element group M1 as a component of the B sites.

Since such two crystal phases are included, the conductive sintered oxide can have a reduced value of constant B. Consequently, by utilizing this sintered oxide as a thermistor element, a thermistor can be obtained in which the constant B is 2,000K or less in the temperature range of −40° C. to +600° C. This thermistor therefore makes possible suitable temperature measurements over a wide temperature range. In addition, in this conductive sintered oxide, the second crystal phase (specifically, the B sites) of the perovskite structure does not contain Cr, which is apt to volatilize at high temperatures. Because of this, a change in composition is less apt to occur in the second crystal phrase. Further, in the conductive sintered oxide, even at high temperatures the conductive sintered oxide retains stable properties.

Also during production, chromium volatilization does not occur during firing and the work is less affected by fluctuations in firing conditions. Consequently, a conductive sintered oxide having a reduced variation in properties is obtained.

The first element group RE1 is an element group consisting of Yb and/or Lu and at least one element selected from Group IIIA (Group 3 new IUPAC numbering) of the periodic table excluding Yb, Lu and La. Examples of the first element group RE1 include: Y and Yb; Y and Lu; and Y, Yb, and Lu.

The second element group RE2 includes at least one of the elements constituting the first element group RE1. Consequently, in the case where the first element group RE1 is, for example, Y and Yb, examples of the second element group RE2 include Y alone, Yb alone, and a combination of Y and Yb. Namely, the first element group RE1 and the second element group RE2 may be the same element group (i.e., may have the same member(s)).

The presence of the first crystal phase and the presence of the second crystal phase (crystal phase having a perovskite-type crystal structure) each can be ascertained by an X-ray diffraction method based on the presence of peaks characteristic of crystals having the same crystal system and a similar composition and the presence of the same elements as in that crystal phase.

The element group SL, which is present so as to form a solid solution with the second element group RE2 (i.e., which substitutes some of the element group RE2) in the A sites of the second crystal phase, includes at least Sr, among Group IIA (Group 2 new IUPAC numbering) elements Sr, Ca and Mg, as a main element in terms of molar proportion. Consequently, the element group SL may consist of Sr alone, or may be a group in which Sr accounts for at least one-half in terms of molar proportion of the element group SL and the remainder includes Ca or Mg or both Ca and Mg.

The element group M1, which is present so as to form a solid solution with the Al (i.e., which substitutes some of the Al) in the B sites of the second crystal phase, consists of at least one element selected from Groups IVA, VA, VIA, VIIA and VIII (Groups 4 to 10 new IUPAC numbering) excluding Cr. Examples thereof include Mn and Fe.

In this conductive sintered oxide, the value of x+y, which is a coefficient indicating the proportion between the A-site elements and the B-site elements, is in the range of $0.95 \leq x+y \leq 1.1$. Namely, the B-site element group may be slightly deficient or in excess with respect to the A-site element group. More preferably, $0.95 \leq x+y \leq 1.05$.

There are cases where an oxygen excess or deficiency results from firing conditions (e.g., oxidizing, reducing, or another firing atmosphere and firing temperature) used for producing the conductive sintered oxide or from the proportion in which an A-site element and a B-site element are substituted by each other. Consequently, the molar ratio of the oxygen atoms to the A-site elements and the molar ratio of the oxygen atoms to the B-site elements in the empirical formula shown above each need not be exactly 3:1 so long as the perovskite-type crystal structure is maintained.

Preferably, the lower limit of the coefficient c of the second crystal phase $c \geq 0.19$. In this case, the constant B ($-40$ to $600°$ C.) can be reduced to 2,000K or below without fail in the presence of the first crystal phase and the second crystal phase.

The conductive sintered oxide described above is desirably a conductive sintered oxide in which the element group SL is Sr.

Besides being Sr, the element group SL, which is present so as to form a solid solution with the second element group RE2 (i.e., which substitutes some of the second element group RE2) in the A sites of the second crystal phase, may be a combination of Ca or Mg with Sr serving as the main element. However, the use of Sr only so as to form a solid solution with the second element group RE2 (or to substitute some of the second element group RE2) is more effective in lowering the constant B for a wide temperature range, e.g., the constant B over the temperature range of $-40$ to $+600°$ C. (constant B($-40$ to $600°$ C.)), than adding those elements in combination. Consequently, the thermistor element employing this conductive sintered oxide has an advantage in that suitable electrical properties (e.g., constant B and resistance) are obtained over a wide temperature range.

Any of the conductive sintered oxides described above is desirably a conductive sintered oxide in which the element group M1 at least includes Mn.

When Mn is used as or in the element group M1, which is present so as to form a solid solution with the Al (i.e., to substitute some of the Al) in the B sites of the second crystal phase, the sintered oxide and the thermistor element employing the sintered oxide have an advantage in that suitable electrical properties (e.g., constant B and resistance) are obtained without fail over a wide temperature range.

Any of the conductive sintered oxides described above is desirably a conductive sintered oxide in which the coefficients x and y of the second crystal phase satisfy the following.

$$0.40 \leq x \leq 0.90$$

$$0.05 \leq y \leq 0.65$$

In this conductive sintered oxide, the B-site elements in the second crystal phase, which second crystal phase has a perovskite structure ($ABO_3$ structure), include the element group M1 besides Al. Furthermore, the coefficients x and y, which specify the molar proportions of the Al and the element group M1 in the B sites, have been regulated so as to satisfy those relationships.

By thus incorporating the element group M1 into the B sites, the sintered oxide can be made to function as a conductor without fail.

The thermistor element of the invention includes any of the conductive sintered oxides described above.

Since the thermistor element of the invention includes the conductive sintered oxide described above, this thermistor element has a suitable temperature gradient constant which allows for temperature measurements over a wide range of, for example, $-40$ to $+600°$ C.

Consequently, in the case where the thermistor element is used to configure a temperature sensor for an exhaust gas temperature measurement as described above, wire breakage detection in a lower-temperature region and short-circuiting detection in a higher-temperature region can each be precisely conducted on the basis of the output from the thermistor element itself.

The temperature sensor of the invention includes the thermistor element described above.

Since the temperature sensor of the invention includes the thermistor element employing the conductive sintered oxide described above, the temperature sensor can be used for temperature measurements over a wide range of, for example, $-40$ to $+600°$ C.

Consequently, in the case where the temperature sensor is used, for example, for measuring the temperature of an exhaust gas as described above, wire breakage detection in a lower-temperature region and short-circuiting detection in a higher-temperature region can each be precisely conducted on the basis of the output from the thermistor element that is used.

BRIEF DESCRIPTION OF THE DRAWINGS

Illustrative aspects of the invention will be described in detail with reference to the following figures wherein.

DESCRIPTION OF REFERENCE NUMERALS AND SIGNS

Reference numerals used to identify various structural features in the drawings including the following.

1 Conductive sintered oxide
2 Thermistor element
2a, 2b Electrode wire
100 Temperature sensor

DETAILED DESCRIPTION OF THE PREFERRED EMBODIMENTS

Examples of thermistor elements 2 employing conductive sintered oxides 1 according to the invention are explained in detail together with Comparative Examples for comparison. However, the present invention should not be construed as being limited to the inventive Examples.

Examples 1 to 11

First, production of conductive sintered oxides 1 and thermistor elements 2 according to Examples 1 to 11 and Comparative Examples 1 to 5 is explained. As starting-material powders, use was made of $Y_2O_3$, $Nd_2O_3$, $Yb_2O_3$, $Lu_2O_3$, $SrCO_3$ (shown in terms of SrO in Table 1), $CaCO_3$ (shown in terms of CaO in Table 1), MgO, $Al_2O_3$, $MnO_2$ and $Fe_2O_3$ (all powders used were commercial products each having a purity of 99% or higher). These starting-material powders were weighed out so as to result in each starting-material feed composition (mol %) shown in Table 1, and then wet-mixed and dried to thereby prepare a starting-material powder mixture. Subsequently, this starting-material powder mixture was calcined at 1,400° C. for 2 hours in air to obtain a calcined powder having an average particle diameter of 1-2 μm. Thereafter, a resin pot and high-purity alumina flint pebbles were used to conduct wet mixing/pulverization using ethanol as a dispersion medium.

Before being mixed with the binder, the synthesized thermistor powder is preferably regulated so as to have an average particle diameter of 2.0 μm or less. Thus, the ingredients can be evenly mixed.

As Table 1 shows, Example 3 is the same as Example 1, except that $Lu_2O_3$ was used in place of the $Yb_2O_3$ used in Example 1. Meanwhile, Example 6 is the same as Example 1, except that $Yb_2O_3$ and $Lu_2O_3$ were used in the same molar amount in place of the $Yb_2O_3$ used in Example 1. Furthermore, Example 9 employed a composition which included $Nd_2O_3$ in place of the $Y_2O_3$ used in Example 1, etc.

Examples 7 and 8 are the same as Example 1, except that CaO or MgO was used in place of some of the SrO used in Example 1.

Furthermore, Example 10 employed a composition which included $Fe_2O_3$ in place of the $MnO_2$ used in Example 1, etc., and Example 11 employed a composition which included $Fe_2O_3$ in place of some of the $MnO_2$ used in Example 1.

Moreover, Comparative Examples 1 and 3 each employed a composition including a smaller amount of SrO than in the Examples to inhibit formation of a first crystal phase as described below and to form a second crystal phase having a reduced value of coefficient c. Comparative Example 2 employed a composition including no $Yb_2O_3$ to inhibit formation of a first crystal phase and to form a second crystal phase having a reduced value of coefficient c. Comparative Examples 4 and 5 each employed a composition including an increased amount of CaO or MgO and a reduced amount of

TABLE 1

| | Starting-material feed composition (mol %) | | | | | | | | | |
|---|---|---|---|---|---|---|---|---|---|---|
| | $Y_2O_3$ | $Nd_2O_3$ | $Yb_2O_3$ | $Lu_2O_3$ | SrO | CaO | MgO | $Al_2O_3$ | $MnO_2$ | $Fe_2O_3$ |
| Example 1 | 27.08 | — | 6.25 | — | 16.67 | — | — | 33.33 | 16.67 | — |
| Example 2 | 27.85 | — | 6.33 | — | 15.19 | — | — | 33.76 | 16.88 | — |
| Example 3 | 27.08 | — | — | 6.25 | 16.67 | — | — | 33.33 | 16.67 | — |
| Example 4 | 25.51 | — | 5.67 | — | 20.24 | — | — | 32.39 | 16.19 | — |
| Example 5 | 26.75 | — | 5.76 | — | 18.11 | — | — | 32.92 | 16.46 | — |
| Example 6 | 27.08 | — | 3.13 | 3.13 | 16.67 | — | — | 33.33 | 16.67 | — |
| Example 7 | 27.08 | — | 6.25 | — | 15.00 | 1.67 | — | 33.33 | 16.67 | — |
| Example 8 | 27.08 | — | 6.25 | — | 15.00 | — | 1.67 | 33.33 | 16.67 | — |
| Example 9 | — | 27.23 | 5.53 | — | 17.87 | — | — | 31.49 | 17.87 | — |
| Example 10 | 28.84 | — | 7.44 | — | 18.60 | — | — | 35.35 | — | 9.77 |
| Example 11 | 27.49 | — | 7.10 | — | 17.74 | — | — | 33.70 | 9.31 | 4.66 |
| Comparative Example 1 | 28.76 | — | 6.64 | — | 11.50 | — | — | 35.40 | 17.70 | — |
| Comparative Example 2 | 37.17 | — | — | — | 9.73 | — | — | 35.40 | 17.70 | — |
| Comparative Example 3 | 28.51 | — | 6.58 | — | 12.28 | — | — | 35.09 | 17.54 | — |
| Comparative Example 4 | 27.08 | — | 6.25 | — | 8.33 | 8.33 | — | 33.33 | 16.67 | — |
| Comparative Example 5 | 27.08 | — | 6.25 | — | 8.33 | — | 8.33 | 33.33 | 16.67 | — |

Subsequently, the resultant slurry was dried at 80° C. for 2 hours to obtain a synthesized thermistor powder. Thereafter, 20 parts by weight of a binder including poly(vinyl butyral) as a main component was added to and mixed with 100 parts by weight of the synthesized thermistor powder. The resultant mixture was dried, subsequently passed through a 250-μm mesh sieve, and granulated to obtain granules.

Useful binders are not limited to poly(vinyl butyral), and other examples thereof include poly(vinyl alcohol) and acrylic binders. The amount of the binder to be incorporated is generally 5-20 parts by weight, preferably 10-20 parts by weight, per 100 parts by weight of the calcined powder.

SrO to inhibit formation of a first crystal phase and to form a second crystal phase having a reduced value of coefficient c.

X-Ray Examination

Subsequently, the granules were uniaxially pressed at a pressure of 20 MPa to mold the granules into a cylindrical shape having a size of 19 mm (diameter) by 2 mm. Thereafter, CIP (cold isostatic pressing) was conducted at a pressure of 150 MPa. The resultant compact was fired at 1,550° C. for 4 hours in the air. Thus, X-ray examination samples of conductive sintered oxides according to Examples 1 to 11 and Comparative Examples 1 to 5 were obtained.

TABLE 2

| | First crystal phase: | Second crystal phase [perovskite-type crystal phase]: $(RE2_{1-c}SL_c)(Al_xM1_y)O_3$ | | | | | | Crystal phases other than first and second crystal phases |
|---|---|---|---|---|---|---|---|---|
| | | A sites: $RE2_{1-c}SL_c$ | | | B sites: $Al_xM1_y$ | | | |
| | $RE1_4Al_2O_9$ | RE2 | c | SL | M1 | x | y | x + y | |
| Example 1 | $(Y, Yb)_4Al_2O_9$ | Y, Yb | 0.26 | Sr | Mn | 0.69 | 0.28 | 0.97 | $SrAl_2O_4, Yb_2O_3$ |
| Example 2 | $(Y, Yb)_4Al_2O_9$ | Y, Yb | 0.20 | Sr | Mn | 0.78 | 0.22 | 1.00 | $SrAl_2O_4, Yb_2O_3$ |
| Example 3 | $(Y, Lu)_4Al_2O_9$ | Y, Lu | 0.29 | Sr | Mn | 0.71 | 0.30 | 1.01 | $SrAl_2O_4, Lu_2O_3$ |
| Example 4 | $(Y, Yb)_4Al_2O_9$ | Y, Yb | 0.38 | Sr | Mn | 0.62 | 0.37 | 0.99 | $SrAl_2O_4, Yb_2O_3$ |
| Example 5 | $(Y, Yb)_4Al_2O_9$ | Y, Yb | 0.24 | Sr | Mn | 0.77 | 0.25 | 1.02 | $SrAl_2O_4, Yb_2O_3$ |
| Example 6 | $(Y, Yb, Lu)_4Al_2O_9$ | Y, Yb, Lu | 0.28 | Sr | Mn | 0.68 | 0.30 | 0.98 | $SrAl_2O_4, Lu_2O_3, Yb_2O_3$ |
| Example 7 | $(Y, Yb)_4Al_2O_9$ | Y, Yb | 0.26 | Sr, Ca | Mn | 0.73 | 0.27 | 1.00 | $SrAl_2O_4, Yb_2O_3$ |
| Example 8 | $(Y, Yb)_4Al_2O_9$ | Y, Yb | 0.26 | Sr, Mg | Mn | 0.73 | 0.26 | 0.99 | $SrAl_2O_4, Yb_2O_3$ |
| Example 9 | $(Nd, Yb)_4Al_2O_9$ | Nd, Yb | 0.23 | Sr | Mn | 0.77 | 0.22 | 0.99 | $SrAl_2O_4, Yb_2O_3$ |
| Example 10 | $(Y, Yb)_4Al_2O_9$ | Y, Yb | 0.25 | Sr | Fe | 0.76 | 0.23 | 0.99 | $SrAl_2O_4, Yb_2O_3$ |
| Example 11 | $(Y, Yb)_4Al_2O_9$ | Y, Yb | 0.25 | Sr | Mn, Fe | 0.75 | 0.25 | 1.00 | $SrAl_2O_4, Yb_2O_3$ |
| Comparative Example 1 | — | Y, Yb | 0.13 | Sr | Mn | 0.82 | 0.18 | 1.00 | $SrAl_2O_4, Yb_2O_3$ |
| Comparative Example 2 | — | Y | 0.10 | Sr | Mn | 0.84 | 0.16 | 1.00 | $SrAl_2O_4, Yb_2O_3$ |
| Comparative Example 3 | — | Y, Yb | 0.15 | Sr | Mn | 0.79 | 0.19 | 0.98 | $SrAl_2O_4, Yb_2O_3$ |
| Comparative Example 4 | — | Y, Yb | 0.11 | Sr, Ca | Mn | 0.82 | 0.17 | 0.99 | $Yb_2O_3$ |
| Comparative Example 5 | — | Y, Yb | 0.12 | Sr, Mg | Mn | 0.83 | 0.17 | 1.00 | $SrAl_2O_4$ |

Thereafter, a surface of each sample was polished and the crystal phases thus generated were identified using an X-ray diffraction apparatus. The results thereof are shown in Table 2. Furthermore, the sample of Example 1 was examined, as a representative example, for X-ray diffraction. The results thereof are shown (see FIG. 1).

Figure 1:
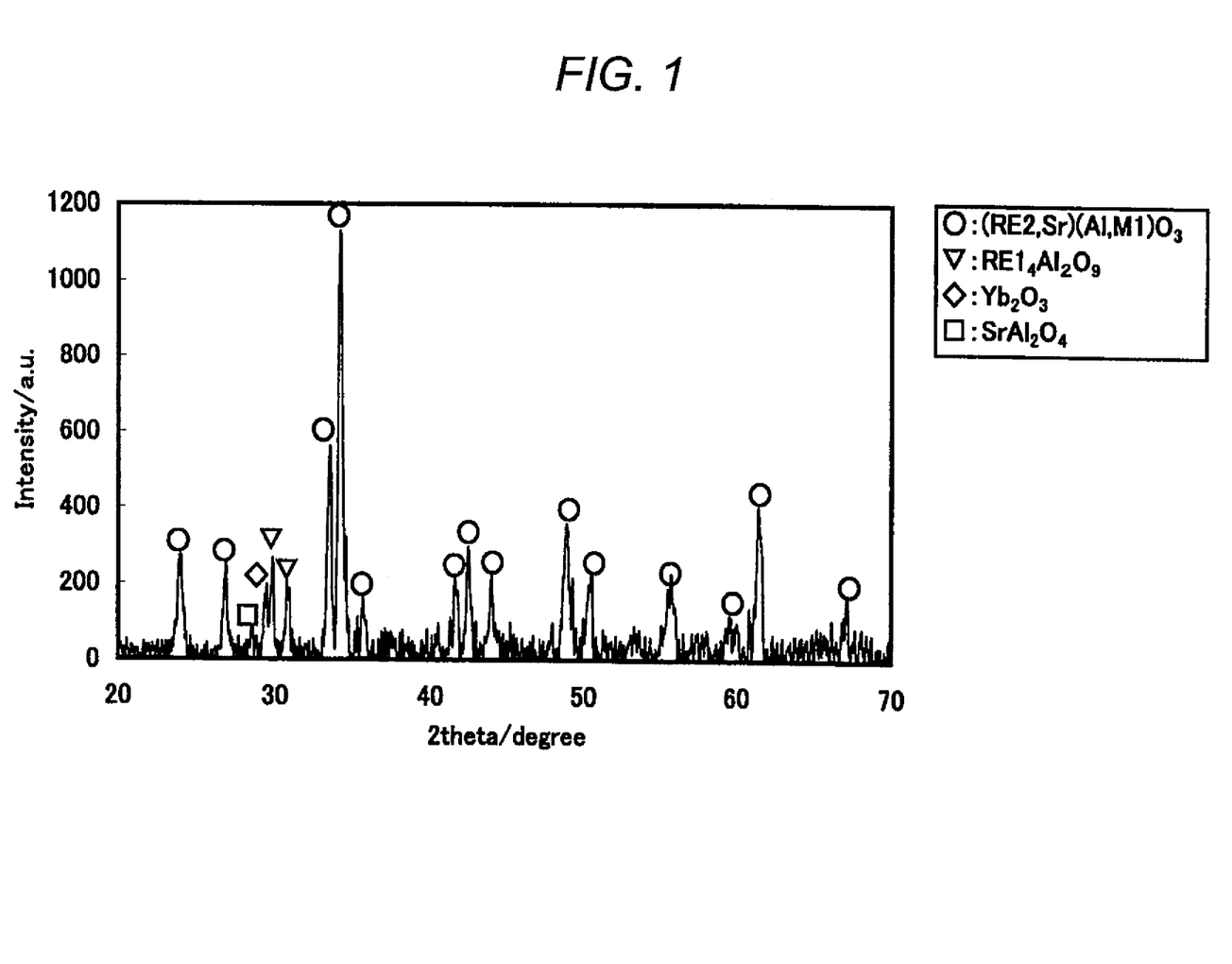
FIG. 1 is a chart showing the results of an examination of the conductive sintered oxide according to Example 1 by an X-ray diffraction method.

In FIG. 1, the peaks indicated by circle symbols are peaks which agree with the diffraction peak data obtained when the crystal is assumed to be $YAlO_3$. It can be seen that the peak arrangement which is characteristic of a perovskite structure has appeared. It can be ascertained from the results that a crystal phase having a perovskite structure (second crystal phase) is present in the sintered oxide of Example 1. The reason why peak data for $YAlO_3$ were used is as follows. Yb (or Lu) and Sr are presumably contained in the A sites besides Y, and Mn is contained in the B sites besides Al. However, these elements are present as a solid solution at the respective sites. It is therefore thought that so long as the second crystal phase is present, a pattern which is akin to the pattern of $YAlO_3$ is exhibited.

Furthermore, the crystal phases, in particular, the perovskite-type crystal phase (second crystal phase), which is a conductive phase, were subjected to compositional analysis by EPMA/WDS (Electron Probe Microanalysis/Wavelength Dispersive Spectrometry). As a result, it was ascertained that Yb (or Lu), Sr (and Ca or Mg), and Mn (or Fe) were present in the perovskite-type crystal phase besides Y and Al. It is therefore thought that the perovskite-type second crystal phase in each of the Examples has a composition which is represented not by $YAlO_3$ but by the empirical formula $(RE2_{1-c}L_c)(Al_xM1_y)O_3$. In each Example, at least any of Y, Yb, Lu, and Nd was used as the element group RE2, and Sr or a combination of Sr and either Ca or Mg was used as the element group SL. Moreover, Mn and/or Fe was used as the element group M1.

Furthermore, from the peaks indicated by inverted-triangle symbols in FIG. 1, a crystal phase having the crystal structure of $RE1_4Al_2O_9$ (first crystal phase) can also be ascertained. Incidentally, this first crystal phase also was assumed to be $Y_4Al_2O_9$ and examined for peaks which agreed with peak data for this crystal. The crystal structure was thus determined. Thereafter, it was ascertained by EPMA/WDS that Yb was contained in the first crystal phase besides Y. With respect to each Example, it was ascertained, in the same manner, that $RE1_4Al_2O_9$ was contained as a first crystal phase.

From the peak indicated by a square symbol, the presence of $SrAl_2O_4$ was ascertained. Moreover, from the peak indicated by a diamond symbol, the presence of $Yb_2O_3$ was ascertained.

With respect to the other Examples and the Comparative Examples, each crystal phase was identified (see Table 2).

It can be seen from those results that in each of Examples 1 to 11, a first crystal phase which was an insulating phase constituted of $RE1_4Al_2O_9$ and other insulating crystal phases constituted of $SrAl_2O_4$ and $Yb_2O_3$ had been generated besides a second crystal phase which was a conductive phase constituted of $(RE2_{1-c}SL_c)(Al_xM1_y)O_3$.

On the other hand it can be seen that in Comparative Example 1, a first crystal phase constituted of $RE1_4Al_2O_9$ had not been generated although a second crystal phase constituted of $(RE2_{1-c}SL_c)(Al_xM1_y)O_3$ and other crystal phases had been generated.

This analysis was also applied to the other Comparative Examples.

It can therefore be seen that the presence of the first crystal phase constituted of $RE1_4Al_2O_9$ which is indicated by the inverted-triangle symbols in FIG. 1 is a major difference between the Examples and the Comparative Examples.

In addition, with respect to the coefficient c of the second crystal phase, it can be seen that the Examples have a larger value of coefficient c than the Comparative Examples.

Incidentally, $SrAl_2O_4$ and $Yb_2O_3$, which are indicated respectively by the square symbol and the diamond symbol in FIG. 1, are present also in each of Comparative Examples 1 to 3. It can hence be seen that the presence of these crystal phases is not especially peculiar to the sintered oxides according to the Examples.

Production of Thermistor Elements

Figure 2:
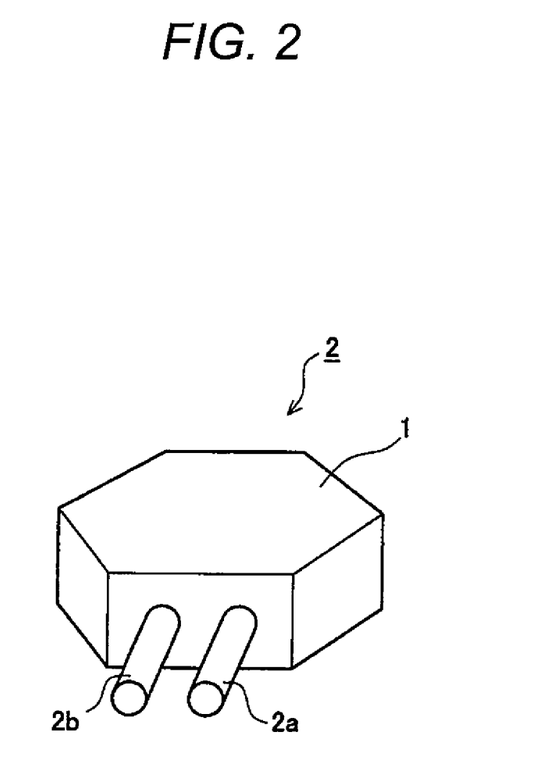
FIG. 2 is a view illustrating the shape of a thermistor element according to Examples 1 to 11.

On the other hand, the granules described above were press-molded using a mold (pressing pressure, 440 MPa (=4,500 kg/cm$^2$)) to obtain a green compact in the shape of a hexagonal plate (thickness, 1.24 mm) in which ends of a pair of electrode wires 2a and 2b made of a Pt—Rh alloy had been embedded, as shown in FIG. 2. Thereafter, the compact was fired at 1,550° C. for 4 hours in the air. Thus, thermistor elements 2 of Examples 1 to 11 were produced. Thermistor elements according to Comparative Examples 1 to 5 also were produced in the same manner.

The thermistor elements 2 each have a hexagonal shape with a side length of 1.15 mm and have a thickness of 1.00 mm. The electrode wires 2a and 2b have a diameter of 0.3 mm, and the distance between the electrode centers is 0.74 mm (gap, 0.44 mm). The electrode insertion depth is 1.10 mm.

Subsequently, the thermistor elements 2 of Examples 1 to 11 and Comparative Examples 1 to 5 were evaluated for constant B (temperature gradient constant) in the following manner. First, each thermistor element 2 was allowed to stand in an environment of T(−40)=233K (=−40° C.), and the initial resistance R(−40) of the thermistor element 2 in this state was measured. Subsequently, this thermistor element 2 was allowed to stand in an environment of T(600)=873K (=600° C.), and the initial resistance R(600) of the thermistor element 2 in this state was measured. The constant B (B(−40 to 600)) was calculated according to the following equation (1).

$$B(-40 \text{ to } 600) = \ln[R(600)/R(-40)]/[1/T(600)-1/T(-40)] \quad (1)$$

In equation (1), R(−40) is the resistance (kΩ) of the thermistor element at −40° C., and R(600) is the resistance (kΩ) of the thermistor element at +600° C.

The results of the determination of the R(−40), R(600), and B(−40 to 600) with respect to each of the Examples and Comparative Examples are shown in Table 3.

TABLE 3

|  | R(−40) (kΩ) | R(600) (kΩ) | B(−40 to 600) (K) |
|---|---|---|---|
| Example 1 | 13.47 | 0.042 | 1834 |
| Example 2 | 26.13 | 0.058 | 1942 |
| Example 3 | 12.08 | 0.039 | 1823 |
| Example 4 | 8.82 | 0.031 | 1796 |
| Example 5 | 17.24 | 0.043 | 1905 |
| Example 6 | 12.55 | 0.040 | 1827 |
| Example 7 | 16.83 | 0.044 | 1890 |
| Example 8 | 15.09 | 0.038 | 1902 |
| Example 9 | 21.80 | 0.049 | 1938 |
| Example 10 | 25.50 | 0.052 | 1969 |
| Example 11 | 14.91 | 0.041 | 1874 |
| Comparative Example 1 | 153.16 | 0.089 | 2368 |
| Comparative Example 2 | 377.31 | 0.105 | 2602 |
| Comparative Example 3 | 78.81 | 0.083 | 2179 |
| Comparative Example 4 | Over range | 0.398 | 3867 |
| Comparative Example 5 | 7759.77 | 0.282 | 3249 |

It can be seen from Table 3 that the thermistor elements 2 employing the sintered oxides of Examples 1 to 11 each had a constant B (B(−40 to 600)) of 2,000K or less. On the other hand, it can be seen that the thermistor elements employing the sintered oxides of Comparative Examples 1 to 5 each had a constant B exceeding 2,000K.

In Comparative Example 4, however, the thermistor element had a large value of resistance R(−40) which was an over-range value, i.e., a value outside the range of resistances measurable with the instrument. The value of resistance at 100° C. was hence measured in place of R(−40), and the constant B(100 to 600) was calculated and shown in the table.

It can be seen from Tables 2 and 3 that the conductive sintered oxides and thermistor elements of Examples 1 to 11 contained a first crystal phase represented by $RE1_4Al_2O_9$, in which RE1 is a first element group consisting of Yb and/or Lu and at least one element selected from Group IIIA (Group 3 new IUPAC numbering) excluding Yb, Lu and La. Examples of the first element group RE1 in the Examples are: Y and Yb; Y and Lu; Y, Yb and Lu; and Nd and Yb.

In addition, it can be seen that the conductive sintered oxides and thermistor elements of Examples 1 to 11 further contained a second crystal phase which has a perovskite structure represented by $ABO_3$ and which is represented by $(RE2_{1-c}SL_c)(Al_xM1_y)O_3$, in which RE2 is a second element group consisting of at least one element selected from Group IIIA (Group 3 new IUPAC numbering) excluding La and further including at least one of the elements constituting the first element group RE1, SL is an element group consisting of at least one of Sr, Ca and Mg and which comprises Sr as a main element in terms of molar proportion, and M1 is an element group consisting of at least one element selected from Groups IVA, VA, VIA, VIIA and VIII (Groups 4 to 10 new IUPAC numbering) excluding Cr.

Examples of the second element group RE2 in Examples 1 to 11 also are: Y and Yb; Y and Lu; Y, Yb and Lu; and Nd and Yb. Examples of the element group M1 are Mn and Fe.

When the element group SL includes Ca or Mg in the same amount as Sr as in Comparative Examples 4 and 5 (see Table 1), i.e., when Sr is not the main element, then the constant B assumes an exceedingly large value. It can therefore be seen that the element group SL preferably includes Sr, among Sr, Ca and Mg, as a main element in terms of molar proportion.

The coefficient c of the second crystal phase in each conductive sintered oxide is in the range of 0.18<c<0.50. The constant B of a thermistor element 2 considerably depends on the properties of the second crystal phase, which is a conductive crystal and has a perovskite crystal structure in which the resistance thereof has a temperature coefficient. By regulating the value of coefficient c of the second crystal phase so as to be within that range (0.18<c<0.50), the constant B (B(−40 to 600)) of the thermistor element 2 can be regulated to a value of 2,000K or below.

The coefficient c is a value which indicates the amount of the element group SL present as a solid solution (proportion of the element group SL) in the elements that occupy the A sites of the perovskite crystal phase (second crystal phase). It is thought that in the case where the amount of the element group SL increases to increase the coefficient c to too large a value (c≥0.5), it becomes difficult to maintain the perovskite crystal phase itself. Therefore, preferably that c<0.5.

Figure 3:
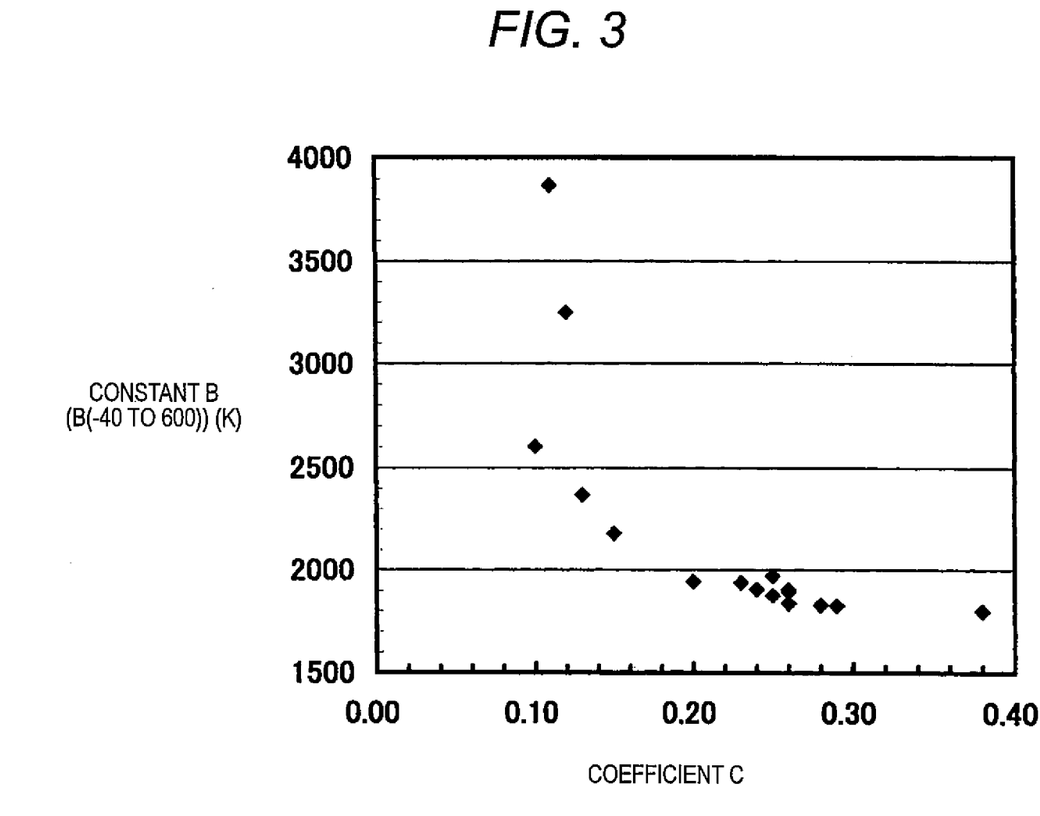
FIG. 3 is a graph showing a relationship between the coefficient c of the second crystal phase and the constant B of the thermistor element.

The values of coefficient c and constant B which are reported in Table 2 and Table 3 with respect to the Examples and Comparative Examples are shown in Table 4, and a relationship between these two properties is shown as a graph in FIG. 3.

TABLE 4

|  | Coefficient c | B(−40 to 600) (K) |
|---|---|---|
| Example 1 | 0.26 | 1834 |
| Example 2 | 0.20 | 1942 |
| Example 3 | 0.29 | 1823 |
| Example 4 | 0.38 | 1796 |
| Example 5 | 0.24 | 1905 |
| Example 6 | 0.28 | 1827 |

TABLE 4-continued

| | Coefficient c | B(−40 to 600) (K) |
|---|---|---|
| Example 7 | 0.26 | 1890 |
| Example 8 | 0.26 | 1902 |
| Example 9 | 0.23 | 1938 |
| Example 10 | 0.25 | 1969 |
| Example 11 | 0.25 | 1874 |
| Comparative Example 1 | 0.13 | 2368 |
| Comparative Example 2 | 0.10 | 2602 |
| Comparative Example 3 | 0.15 | 2179 |
| Comparative Example 4 | 0.11 | 3867 |
| Comparative Example 5 | 0.12 | 3249 |

It can be understood from Table 4 and FIG. 3 that the coefficient c should be c>0.18. Preferably c≥0.19. In this manner, the constant B (B(−40 to 600)) can be regulated to 2,000K or less without fail.

In Example 7, the element group SL includes Ca in an amount of 10 mol % based on the whole of element group SL, besides Sr (Sr:Ca=9:1). In Example 8, the element group SL includes Sr as a main element, and further includes Mg in an amount of 10 mol % (Sr:Mg=9:1). These configurations also can bring about a constant B of 2,000K or less.

However, as can be easily understood, for example, from a comparison between Example 1, in which Sr only was used, and Examples 7 and 8, in which Ca or Mg was added to Sr, the sintered oxides in which Sr alone was used as the element group SL are preferred. This is because these sintered oxides are more effective in lowering the constant B than the sintered oxides in which Ca or Mg is included in the element group SL (is contained in the A sites of the second crystal phase).

By incorporating the element group M1 as B-site elements besides Al, the sintered oxide can be made to function as a conductor without fail.

Notably, Cr has been excluded from the element group M1 which is present so as to form a solid solution with Al (or substitute some of the Al) in the B sites of the second crystal phase. Even when Cr is present in the second crystal phase (B sites) of a perovskite structure, the Cr is apt to volatilize at high temperatures. Because of this, conductive sintered oxides containing Cr are apt to suffer a change in composition of the second crystal phase, and there are cases where such sintered oxides give thermistor elements 2 having poor stability in terms of the constant B and insulation resistance. In contrast, in each of the conductive sintered oxides (thermistor elements) of the Examples, the second crystal phase of the perovskite structure contained no Cr. Because of this, even at high temperatures, the second crystal phase and the conductive sintered oxide are less apt to suffer a change in composition and the conductive sintered oxide shows stable properties.

In addition, also during the production of thermistor elements or the like, chromium volatilization does not occur during firing and the work hence is less affected by fluctuations in firing conditions, e.g., fluctuations in firing temperature. Thus, there is an advantage in that conductive sintered oxides and thermistor elements which have a reduced variation in properties are obtained.

With respect to the element group M1, Mn is preferably used as shown in the Examples other than Example 10, or Fe is preferably included as in Examples 10 and 11.

In particular, elements Al, Mn and Fe, which occupy the B sites, are akin to each other in ionic radius, and can be easily substituted by one another. By-products constituted of these elements are less apt to generate, and the crystal phase which has a composition resulting from the substitution stably exists. Because of this, by continuously changing the composition over a wide range, the resistivity and temperature gradient constant (constant B) of the conductive sintered oxide can be regulated.

Thus, when Mn or Fe is used as the element group M1 which forms a solid solution with Al in the B sites of the second crystal phase, there is an advantage in that suitable electrical properties (e.g., constant B and resistance) are obtained without fail over a wide temperature range with respect to the conductive sintered oxide and the thermistor element employing the sintered oxide.

It can, however, be seen from a comparison between Example 10 and Example 11 that the thermistor element of Example 11, in which Mn and Fe were used as the element group M1, can have a smaller value of constant B than the thermistor element of Example 10, in which Fe only was used as the element group M1. It can therefore be seen that from the standpoint of the constant B, at least Mn is preferably used as the element group M1.

In addition, the sum of coefficients x and y for this second crystal phase, x+y, is in the range of 0.95≤x+y≤1.1 in each of the Examples and Comparative Examples. The sum of coefficients x and y is a value that indicates the proportion between the element group $(RE2_{1-c}SL_c)$, which constitutes the A sites of the second crystal phase, and the element group $(Al_xM1_y)$, which constitutes the B sites.

Since the second crystal phase has a perovskite structure, the ratio of the amount of the elements to be disposed at the A sites to the amount of the elements to be disposed at the B sites should be 1:1. However, even when the amount of the B-site elements, relative to the amount of the A-site elements, is in excess (x+y>1) or deficient (x+y<1) to some degree, the desired properties of the thermistor element (sintered oxide) are obtained. Consequently, the value of x+y is within that range.

More preferably, 0.95≤x+y≤1.05. The reason for this is as follows. By regulating the second crystal phase having a perovskite structure so as to satisfy such a relationship, the second crystal phase is made more stable. Consequently, the conductive sintered oxide including such a crystal phase has stabilized properties, and this in turn stabilizes the properties of the thermistor element employing the conductive sintered oxide.

It can be seen that each of the thermistor elements 2 employing the conductive sintered oxides 1 having the compositions of Examples 1 to 11 had a constant B (B(−40 to 600)) of 2,000K or less, which is a relatively small value as compared with conventional values. These thermistor elements 2 employing the conductive sintered oxides 1 of Examples 1 to 11, which had such a value of constant B, had a suitable value of resistance over the wide range of a low temperature of −40° C. to +600° C. and allowed for suitable temperature measurements.

On the other hand, each of Comparative Examples 1 to 5 had a constant B (B(−40 to 600)) as large as 2,100K or above.

In Comparative Example 1, the composition included Y, Yb and Al (see Comparative Example 1 in Table 1). First of all, however, a first crystal phase $((Y, Yb)_4Al_2O_9)$ had not been generated (see Table 2). Furthermore, the coefficient c was c≤0.13, outside the suitable coefficient c range of 0.18<c<0.50.

In Comparative Example 2 also, the composition included Y and Al (see Comparative Example 2 of Table 1). However, formation of a first crystal phase $(Y_4Al_2O_9)$ was not ascertained. Furthermore, the coefficient c was 0.10, outside the range of 0.18<c<0.50.

In Comparative Example 3 also, a first crystal phase had not been formed (see Table 2), and the coefficient c was 0.15, outside the range of 0.18<c<0.50.

It is thought that since Comparative Examples 1 to 3 each had such differences, the thermistor elements 2 had a constant B larger than 2,100K.

Furthermore, in Comparative Example 4, the element group SL included a large proportion of Ca besides Sr, and a first crystal phase had not been formed. Moreover, the coefficient c was 0.11. Because of these factors, the thermistor element 2 had a constant B which was an exceedingly large value above 3,800K. In Comparative Example 5, the element group SL included a large proportion of Mg besides Sr, and a first crystal phase had not been formed. Moreover, the coefficient c was 0.12. It is thought that because of these factors, the thermistor element 2 had a constant B which was an exceedingly large value above 3,200K.

It can be seen from these results that in order that the constant B might satisfy B(−40 to 600)<2000K, it is preferable to generate a first crystal phase, to use Sr as the main component of the element group SL, and to regulate the coefficient c so as to be c>0.18.

It can be seen from the results given above that the thermistor elements in which the first crystal phase described above is present and the coefficient c for the second crystal phase satisfies the range shown above (0.18<c<0.50) (Examples 1 to 11) each can have a constant B as small as 2,000K or below.

Figure 4:
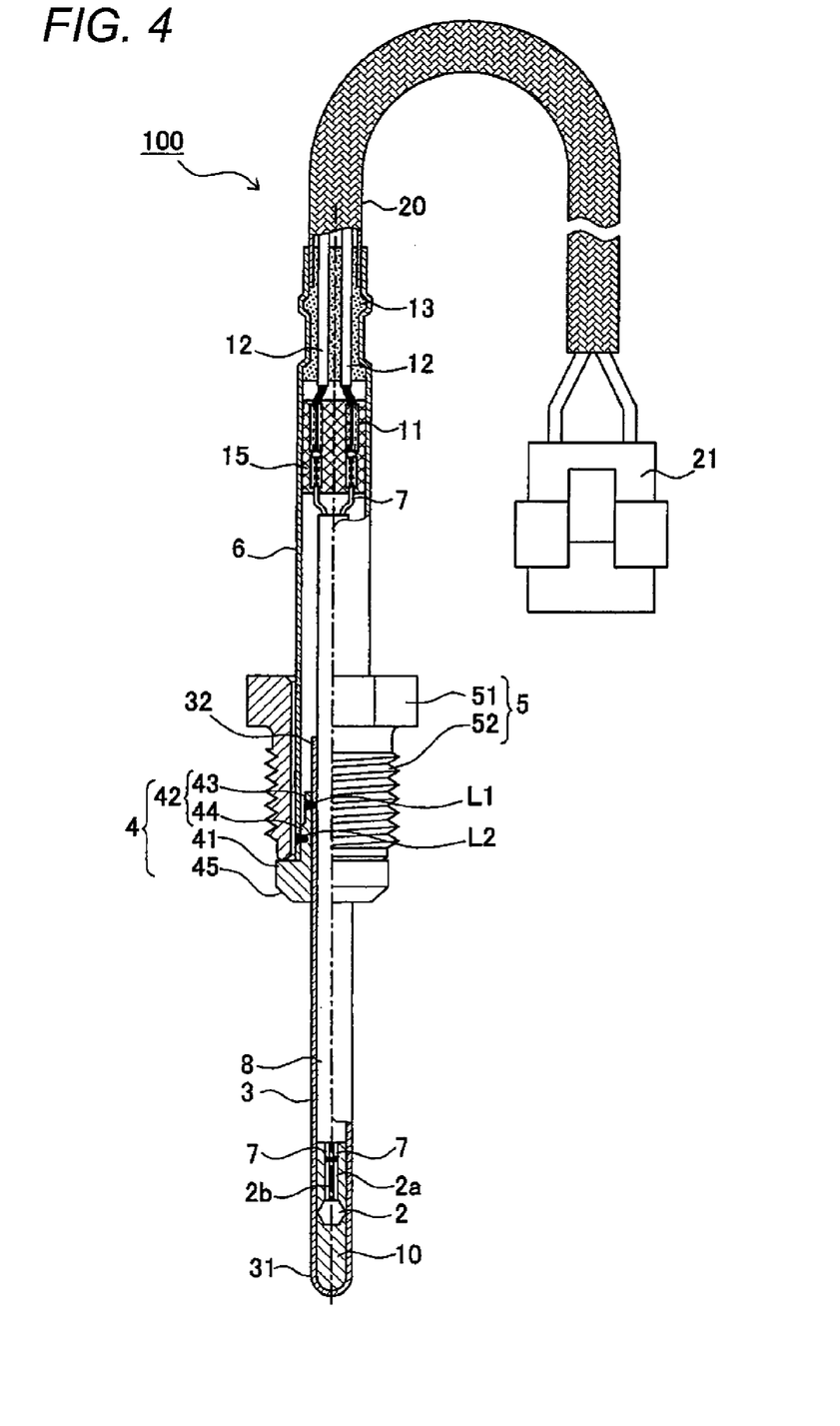
FIG. 4 is a partial sectional view illustrating the structure of a temperature sensor employing the thermistor element of FIG. 2.

The configuration of a temperature sensor 100 employing a thermistor element 2 as used in the Examples is explained below by reference to FIG. 4. The temperature sensor 100 employs the thermistor element 2 as a thermosensitive element. The temperature sensor 100 is attached to the mounting part of the exhaust pipe of a motor vehicle so that the thermistor element 2 is disposed within the exhaust pipe through which the exhaust gas flows. The temperature sensor 100 is thus used for measuring the temperature of the exhaust gas.

The temperature sensor 100 includes a metallic tube 3 which extends in the direction of the axis thereof (hereinafter referred to as the axial direction). The metallic tube 3 has the shape of a bottomed cylinder which is closed at its front end part 31 (lower end in FIG. 4). The thermistor element 2 of the Examples is disposed in the front end part 31. The metallic tube 3 undergoes a heat treatment beforehand, and the outer and inner side surfaces thereof are oxidized and coated with an oxide coating film. The space which surrounds the thermistor element 2 in the metallic tube 3 is filled with a cement 10 to fix the thermistor element 2. The rear end 32 of the metallic tube 3 is open, and this rear end 32 is forced and inserted into a flange member 4.

The flange member 4 includes a cylindrical sheath part 42 extending in the axial direction and a flange part 41 which is located on the front end side of the sheath part 42 (lower part in FIG. 4), has a larger outer diameter than the sheath part 42, and projects outward in the radial direction. The front end of the flange part 41 constitutes a tapered bearing surface 45 for sealing on the mounting part of an exhaust pipe. The sheath part 42 has a two-stage shape composed of a front-side sheath part 44, which is located on the front side, and a rear-side sheath part 43, which has a smaller diameter than the front-side sheath part 44.

The outer peripheral surface of the metallic tube 3 forced into the flange member 4 is laser-welded at the part L1 to the rear-side sheath part 43 throughout the entire periphery thereof, and the metallic tube 3 is thereby fixed tenaciously to the flange member 4. A metallic cover member 6 of a substantially cylindrical shape is placed on the front-side sheath part 44 of the flange member 4 and gas-tightly laser-welded at the part L2 to the front-side sheath part 44 throughout the entire periphery thereof.

A mounting member 5 having a hexagonal nut part 51 and a screw part 52 is rotatably fitted on the periphery of the flange member 4 and metallic cover member 6. The temperature sensor 100 of the Examples is fixed to an exhaust pipe (not shown) by bringing the bearing surface 45 of the flange part 41 of the flange member 4 into contact with the mounting part of the exhaust pipe and screwing the mounting member 5 into the mounting part.

A sheath member 8 having a pair of core wires 7 therein is disposed within the metallic tube 3, flange member 4, and metallic cover member 6. The sheath member 8 is configured of a metallic outer casing, the pair of conductive core wires 7, and an insulating powder which fills the space inside the outer casing and holds the core wires 7 while insulating the outer casing from the core wires 7. An oxide coating film is formed beforehand by a heat treatment also on the outer casing of the sheath member 8. The electrode wires 2a and 2b of the thermistor element 2 are connected by laser welding to the core wires 7 which project (downward in the figure) from the front end of the outer casing of the sheath member 8 in the metallic tube 3.

On the other hand, the core wires 7 projecting from the rear end of the sheath member 8 are connected to a pair of lead wires 12 by means of crimping terminals 11. The core wires 7 are insulated from each other and the crimping terminals 11 are insulated from each other by means of insulating tubes 15.

The pair of lead wires 12 is led out from inside the metallic cover member 6 through lead wire insertion holes of an elastic sealing member 13 inserted into a rear end part of the metallic cover member 6, and is connected to the terminal members of a connector 21 for connection to an external circuit (not shown; for example, an ECU). Thus, the output from the thermistor element 2 is taken out of the core wires 7 of the sheath member 8 and sent to an external circuit, which is not shown, through the lead wires 12 and the connector 21. The temperature of the exhaust gas is thereby measured. The lead wires 12 are covered with a glass-braided tube 20 for protection against external force such as flying stones. A front end part of the glass-braided tube 20 is fixed by crimping to the metallic cover member 6 together with the elastic sealing member 13.

Since the temperature sensor 100, which has the structure described above, employs the thermistor element 2 including the conductive sintered oxide 1 described above, the temperature of the exhaust gas of an automobile engine can be suitably measured with the temperature sensor over a wide range of a low temperature of −40° C. to a high temperature of +600° C.

Furthermore, by selecting a suitable pull-up resistance for use in a detection circuit, the temperature sensor 100 can be configured so that when, for example, a voltage of 5 V is applied to the temperature sensor 100, the output therefrom can be obtained as a voltage which varies in the range of 4.8-0.2 V in the temperature range of −40° C. to +600° C. Consequently, even when the output is inputted to a circuit having a maximum input voltage of 5 V, the temperature can be suitably measured. In addition, even when the temperature sensor 100 (thermistor element 2) has a low temperature (−40° C.), the output therefrom is about 4.8 V and does not reach 5.0 V. A difference between this state and wire breakage can hence be recognized, and wire breakage can be easily and precisely detected. Likewise, even when the temperature sensor 100 (thermistor element 2) has a high temperature (+600° C.) the output therefrom is about 0.2 V and does not fall to 0

V. A difference between this state and short-circuiting can hence be recognized, and short-circuiting can be easily and precisely detected.

The invention has been described above by reference to the above Examples. However, the invention should not be construed as being limited thereto. It should further be apparent to those skilled in the art that various changes in form and detail of the invention as shown and described above may be made. It is intended that such changes be included within the spirit and scope of the claims appended hereto.

For example, for producing the conductive sintered oxide (thermistor element), powders of the compounds containing elements shown in the Examples can be used as starting-material powders. Also usable besides these are compounds such as oxides, carbonates, hydroxides and nitrates. The use of oxides or carbonates is especially preferred.

Furthermore, the conductive sintered oxide may contain other components such as, for example, Na, K, Ga, Si C, Cl and S so long as the incorporation of such components does not impair sinterability for producing the conductive sintered oxide or the properties required of the conductive sintered oxide, thermistor element, or temperature sensor, such as the constant B and high-temperature durability of temperature characteristics. It should, however, be noted that the conductive sintered oxide does not contain Cr.

This application claims priority from Japanese Patent Application No. 2010-182636 filed on Aug. 17, 2010, the disclosure of which is incorporated herein by reference in its entirety.

What is claimed is:

1. A conductive sintered oxide which comprises:
   a first crystal phase having a composition represented by $RE1_4Al_2O_9$ and
   a second crystal phase having a perovskite structure represented by $(RE2_{1-c}SL_c)(Al_xM1_y)O_3$, in which
   RE1 is a first element group consisting of Yb and/or Lu and at least one element selected from Group IIIA elements excluding Yb, Lu and La,
   RE2 is a second element group consisting of at least one element selected from Group IIIA elements excluding La and including at least one of the elements constituting the first element group RE1,
   SL is an element group consisting of at least one of Sr, Ca and Mg and which includes Sr as a main element thereof in terms of molar proportion, and
   M1 is an element group consisting of at least one element selected from Groups IVA, VA, VIA, VIIA and VIII excluding Cr,
   the coefficient c of the second crystal phase is in the range of $0.18<c<0.50$, and
   the coefficients x and y of the second crystal phase are in the range of $0.95 \leq x+y \leq 1.1$;
   wherein the conductive sintered oxide has a B constant of less than 2,000 K, within a temperature range of from $-40°$ C. to $+600°$ C.

2. The conductive sintered oxide according to claim 1, wherein the element group SL consists of Sr.

3. The conductive sintered oxide according to claim 1, wherein the element group M1 comprises Mn.

4. The conductive sintered oxide according to claim 1, wherein the coefficients x and y of the second crystal phase satisfy the following:

$$0.40 \leq x \leq 0.90$$

$$0.05 \leq y \leq 0.65.$$

5. A thermistor element having a part formed of a sintered electroconductive oxide as recited in claim 1.

6. A temperature sensor having a thermistor element as recited in claim 5.

7. A thermistor element which comprises a conductive sintered oxide-which comprises:
   a first crystal phase having a composition represented by $RE1_4Al_2O_9$ and
   a second crystal phase having a perovskite structure represented by $(RE2_{1-c}SL_c)(Al_xM1_y)O_3$, in which
   RE1 is a first element group consisting of Yb and/or Lu and at least one element selected from Group IIIA elements excluding Yb, Lu and La,
   RE2 is a second element group consisting of at least one element selected from Group IIIA elements excluding La and including at least one of the elements constituting the first element group RE1,
   SL is an element group consisting of at least one of Sr, Ca and Mg and which includes Sr as a main element thereof in terms of molar proportion, and
   M1 is an element group consisting of at least one element selected from Groups IVA, VA, VIA, VIIA and VIII excluding Cr,
   the coefficient c of the second crystal phase is in the range of $0.18<c<0.50$, and
   the coefficients x and y of the second crystal phase are in the range of $0.95 \leq x+y \leq 1.1$.

8. A temperature sensor which comprises the thermistor element according to claim 7.

* * * * *